United States Patent [19]

Waddill

[11] 4,179,552

[45] Dec. 18, 1979

[54] PROCESS FOR ACCELERATED CURE OF EPOXY RESINS

[75] Inventor: Harold G. Waddill, Austin, Tex.

[73] Assignee: Texaco Development Corp., White Plains, N.Y.

[21] Appl. No.: 890,748

[22] Filed: Mar. 27, 1978

[51] Int. Cl.$^2$ .................... C08G 59/50; C08G 59/60
[52] U.S. Cl. ............................... 528/111; 528/93; 528/94; 528/367; 528/407; 525/507; 525/526
[58] Field of Search .................. 528/111, 135, 407, 93, 528/94, 367, 88; 260/830 R

[56] References Cited

U.S. PATENT DOCUMENTS

| | | | |
|---|---|---|---|
| 3,380,881 | 4/1968 | Williamson et al. | 161/185 |
| 3,462,393 | 8/1969 | Legler | 260/47 |
| 3,496,138 | 2/1970 | Sellers et al. | 260/47 |
| 3,645,969 | 2/1972 | Harvey | 260/47 EN |
| 4,002,598 | 1/1977 | Waddill et al. | 260/47 EN |

OTHER PUBLICATIONS

Kirk-Othmer, "Encyclopedia of Chemical Technology", 2d Ed., 1965, Wiley & Sons TPQE68 1963.

*Primary Examiner*—Earl A. Nielsen
*Attorney, Agent, or Firm*—Carl G. Ries; Thomas H. Whaley; Kenneth R. Priem

[57] ABSTRACT

A process for the accelerated cure of an epoxy resin is disclosed. The resulting epoxy resin may be used in protective coatings, adhesives, seamless and terrazo flooring and caulking and sealing compositions. The resulting resin is also useful, for example, in casting, potting, in escapulating, grouting and patching. The process involves mixing an epoxy resin of the polyhydric phenol, polyglycidyl ether type with a curing agent comprising the reaction product of an epoxy resin with an excess of an aminoalkylene derivative of a polyoxyalkylenepolyamine.

22 Claims, No Drawings

PROCESS FOR ACCELERATED CURE OF EPOXY RESINS

BACKGROUND OF THE INVENTION

The present invention relates to the field of curing epoxy resins.

Polyoxypropylenepolyamines react with epoxy resins at a rate which is unsatisfactorily slow for certain applications. In order to provide a rate of cure which is satisfactory for most uses an accelerator must be used with the polyoxypropylenepolyamines in order to speed the rate of cure.

Lee, Henry and Neville, Kris, *Handbook of Epoxy Resins*, McGraw-Hill Book Co., N.Y., 1967 p. 7–14, describes the use of N-(2-aminoethyl)piperazine as an epoxy curing agent and at page 11–18 describes the use of salicylic acid as an accelerator for urea-formaldehyde epoxy resin coatings. Bobby Legler's U.S. Pat. No. 3,462,393 (Aug. 18, 1969) teaches the use of polyoxyalkylenepolyamines as curing agents for a polyglycidyl ether of a phenolic compound.

U.S. Pat. No. 3,639,928 claims the use of a combination of N-(3-aminopropyl)piperazine and salicylic acid as an accelerator combination with polyoxyalkylenepolyamine for curing epoxy resins.

SUMMARY OF THE INVENTION

The invention is a process for the accelerated cure of an epoxy resin composition of the polyhydric phenol, polyglycidyl ether type. The process involves mixing the epoxy resin with a curing agent comprising the reaction product of an epoxy resin with an excess of an aminoalkylene derivative of a polyoxyalkylenepolyamine and allowing the mixture to cure at ambient or elevated temperatures.

The invention is also the cured epoxy resin.

DESCRIPTION OF THE PREFERRED EMBODIMENTS

The epoxy resin used herein can be any of the well known epoxy resins having an epoxy equivalency of more than one, for example, the polyglycidyl ether of polyhydric phenol. These materials have at least 1.8 reactive, 1,2-epoxy groups per molecule. As is well known in the art, these resins may be prepared by condensing epichlorohydrin with a polyhydric alcohol or phenol, for example, ethylene glycol, diethylene glycol, glycerol, diglycerol, catechol, resorcinol, a trihydroxybenzene, a di(hydroxyphenyl) methane, a di(hydroxyphenyl) ethane, a di(hydroxyphenyl) propane, etc. A preferred type of polyepoxide is that derived from condensing epichlorohydrin with 2,2'-bis-(p-hydroxyphenyl)propane, known generally as bisphenol-A, and having an epoxide equivalent weight of from 175 to 195.

The aminoalkylene derivatives of polyoxyalkylenepolyamines can be made by reacting polyoxyalkylenepolyamines with acrylonitrile followed by hydrogenation of the product. Examples of the polyoxyalkylenepolyamines used as starting materials include compounds of the following formulae:

$$H_2NCH(CH_3)CH_2[OCH_2CH(CH_3)]_xNH_2 \quad (I)$$

where x=2 to 40 and

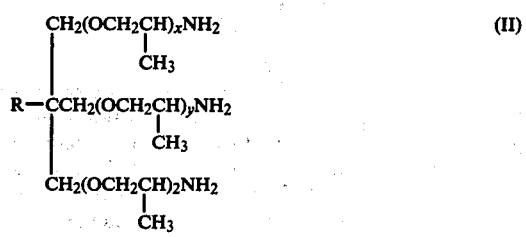

where R is a lower alkyl and x+y+z=3 to 40 and

where x+z 2 to 10 and y 1 to 50.

After reaction with acrylonitrile and subsequent hydrogenation the resulting aminoalkylene derivative of polyoxyalkylenepolyamines have the following formulae:

$$H_2NCH_2CH_2CH_2HNCH(CH_3)CH_2[OCH_2CH(CH_3)]_xNHCH_2CH_2NH_2 \quad (I)$$

where x=2 to 40 and

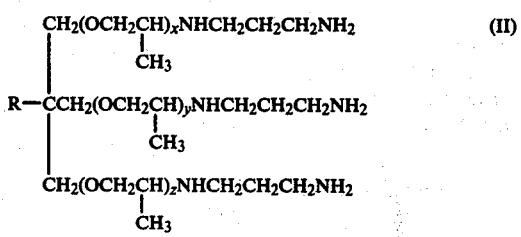

where R is a lower alkyl and x+y+z=3 to 40 and

where x+z=2 to 10 and y=1 to 50.

The curing (hardening) agent consists of an adduct of the aminoalkylene derivative of polyoxyalkylenepolyamine with an epoxy resin. Preferably, the resin should be the same as will later be cured by the adduct to promote compatability. A substantial excess of amine must be present so that the adduct will consist of unreacted amine and adduct, with no unreacted epoxy resin. Use of this adduct results in several advantages including low volatility, rapid cure and reduced toxicity.

A preferred adhesive formulation consists of the aminoalkylene derivative of polyoxyalkylenepolyamine-epoxy resin adduct, an accelerator and a bisureide of a 2000 molecular weight polyoxyalkylenepolyamine. The bisureide prevents embrittlement of the cured adhesive bond.

The polyether diureide additive can generally be described as polyoxyalkylene containing materials having terminal ureido or mono-substituted ureido groups and a molecular weight of from about 2000 to about 3000. More specifically, these compounds are polyoxyalkylene compounds having terminal ureido groups, of the formula:

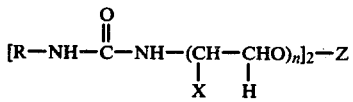

wherein R is hydrogen; or, a branched or straight chain alkyl radicals of from 1 to about 10 carbon atoms, and more preferably from 1 to about 6; or a monocyclic aryl, alkaryl or aralkyl having from 6 to about 12 carbon atoms; and more preferably 6 to about 8; or, are branched or straight chain alkenyl or alkadienyl radical of from 2 to about 10 carbon atoms and more preferably 3 to about 8; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000. The preferred diureides are of the above formula wherein R is hydrogen or a lower alkyl, and more preferably a lower alkyl of from 1 to 4 carbon atoms; X is a methyl radical; Z is a 1,2-propylene radical; and n is a number from 16 to 19. Preferred lower alkyl groups include methyl, ethyl, n-propyl and n-butyl.

The polyether diureide compounds are formed by the reaction of a ureido or mono-substituted ureido forming compound with a polyoxyalkylene diamine having a molecular weight value such that the ureido containing product has a molecular weight of from about 2000 to about 3000 at temperatures in the range from about 25° C. to about 150° C. in a molar ratio of about 2 moles of ureido or mono-substituted ureido forming compound for each mole of diamine.

The diamines that are useful in forming the additives are polyoxyalkylene diamines of the formula:

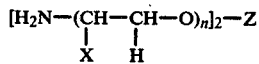

wherein X is a hydrogen, a methyl radical or an ethyl radical; Z is a hydrocarbon alkylene radical having from 2 to 5 carbon atoms; and, n is an average number of from about 15 to about 25. Preferred polyoxypropylene diamines wherein X is a methyl radical, n is an average number from 16 to 19, Z is a 1,2-propylene radical. These polyoxyalkylene polyamines can be prepared by known methods as disclosed in U.S. Pat. Nos. 3,236,895 and 3,654,370.

The ureido forming compounds are generally those which supply the O=C—NH$_2$ radical. Urea is preferred. When urea is employed as a reactant, the reaction proceeds with the evolution of ammonia and the terminal primary amino groups of the polyoxyalkylenepolyamine are converted directly to ureido groups.

While urea is the preferred ureido forming compound, other ureido forming compounds can be utilized. Since the polyoxyalkylenepolyamine reactant already contains terminal primary amino groups, isocyanates of the general formula M+NCO−, wherein M+ is generally an alkali metal such as potassium, sodium and the like can be used. The preferred isocyanates that can be used in accordance with the instant invention are sodium and potassium isocyanate primarily because of availability.

The mono-substituted ureido forming compounds are generally isocyanates of the formula R—N=C= wherein R has the character of either an aliphatic or aromatic monovalent hydrocarbon radical as defined herein above.

In accordance with this method, the reactants are simply admixed in correct molar ratios in a suitable reaction vessel and heated, if necessary, until the reaction occurs.

The functionality of the polyoxyalkylenepolyamine is dependent upon the number of terminal primary amino groups which in the instant case is 2. It will be realized that each mole of ureido forming compound or substituted ureido forming compound will react with a single terminal primary amino group of the polyoxyalkylenepolyamine. It is particularly important that, in forming the additive compounds of the instant invention, a specific molar ratio of reactants be maintained. Specifically, about 1 mole of ureido forming compound for each amino group of the polyoxyalkylenepolyamine is required. Thus, with the diamine, about 2 moles of ureido forming compound is utilized. Preferably the instant reaction is carried out in the presence of a slight excess of ureido forming compound to assure complete conversion of the amino groups.

Optionally, the epoxy resin formulations of the instant invention can include an "accelerator" to speed the amine cure of the epoxy resin, especially at ambient temperatures. In several applications, such acceleration is beneficial, especially when an epoxy resin is used as an adhesive in flammable environment, thus making elevated temperature cure inconvenient or even hazardous. Lee, H. and Neville, K., Handbook of Epoxy Resins, pp. 7–14 describes the use of certain amine-containing compounds as epoxy curing agent-accelerators.

Many accelerators are known in the art which can be utilized in accordance with the instant invention. Examples include salts of phenols; salicyclic acids; amine salts of fatty acids such as those disclosed in U.S. Pat. No. 2,681,901; and, tertiary amines such as those disclosed in U.S. Pat. No. 2,681,480. A preferred accelerator in accordance with the instant invention is disclosed in U.S. Pat. No. 3,875,072 issued to G. Waddill, Apr. 1, 1975. The accelerator comprises a combination of piperazine and an alkanol amine in a weight ratio of about 1:8 to 1:1.

According to the method of the instant invention, the adhesion properties of prior art amine-cured epoxy resins are enhanced by the addition of an effective amount of a polyether diureide having terminal ureido or monosubstituted ureido groups and a molecular weight of from 2000 to about 3000 as hereinbefore described. The amount of additive effective in bringing about the increased adhesive property is somewhat empirical and will depend upon the resin, the amine curing agent, and the use of an accelerator. Generally, the diureido additive can be utilized in amounts from about 5 to about 50 parts by weight based on one hundred parts by weight of the resin constituent.

The amine cured resin, in accordance with the present invention, is prepared in a conventional manner. The amine curing agent comprising the adduct of an epoxy resin with an excess of an aminoalkylene derivative of a polyoxyalkylenepolyamine is admixed with the polyepoxide composition in amounts according to the amine equivalent weight of the curing agent. Generally, the number of equivalents of amine groups is from about 0.8 to about 1.2 times the number of epoxide equivalents present in the curable epoxy resin composition, with a stoichiometric amount being preferred. When using an accelertor, amounts from 1 to about 10 parts by weight based on 100 parts by weight of the resin are generally satisfactory. The exact amount of constituents in accordance with the above general requirements will depend primarily on the application for which the cured resin is intended.

The diureide and the epoxy-aminoalkylene derivative of a polyoxyalkylenepolyamine adduct are incorporated into the uncured epoxy resin by admixing. Preferably the amine constituents are first admixed and then the accelerator is added prior to the addition of the epoxy resin. The constituents forming the curable material is then intimately admixed by standard methods and degassed in the presence of a commercial defoamer and minute amounts of silicone oil to prevent voids and bubbles. Generally, the curable mixture is allowed to self cure at ambient temperatures of between 0° C. to about 45° C. However, it has been found expeditious that the mixture be post cured at elevated temperatures of up to about 135° C.

It will be further realized that various conveniently employed additives can be admixed with the polyepoxide containing composition of the present invention prior to final cure. For example, in certain instances, it may be desired to add minor amounts of other polyalkylene amine co-catalysts, or hardeners, along with various other accelerators and curing agents systems well known in the art.

Additionally, conventional pigments, dyes, fillers, flame retarding agents and the like which are compatible may be added.

Furthermore, although not preferred, known solvents for polyepoxide materials such as toluene, benzene, xylene, dioxane, ethylene glycol, monomethylether and the like can be used. The polyepoxide resins containing the additives of the present invention can be used in any of the above applications for which polyepoxides are customarily used.

EXAMPLE 1

This example illustrates the large increase in early tensile shear strength when an adduct of epoxyaminoalkylene derivative of a polyoxyalkylenepolyamine is used to cure the epoxy resin.

| Formulation: | A | B | C | D | E | F |
|---|---|---|---|---|---|---|
| Epoxy Resin (EEW 190) | 100 | 100 | 100 | 100 | 100 | 100 |
| JEFFAMINE ® D-230 BPA[1] | 30 | — | 30 | — | 30 | — |
| JEFFAMINE ® D-230 BPA/Epoxy resin adduct | — | 46 | — | 46 | — | 46 |
| Accelerator 398 | — | — | 10 | 10 | 10 | 10 |
| JEFFAMINE ® BuD- | — | — | 10 | 10 | — | — |
| Tensile shear strength, psi | | | | | | |
| after: 4 hrs. R.T. | 5 | 0 | 700 | 1100 | 800 | 1500 |
| 8hrs. R.T. | 900 | 1800 | 2600 | 3000 | 3200 | 3200 |
| 16 hrs. R.T. | 2200 | 2100 | 3400 | 3600 | 1400 | 1500 |
| 24 hrs. R.T. | 1200 | 2200 | 3400 | 3400 | 1000 | 1500 |
| 48 hrs. R.T. | 1300 | 1600 | 3500 | 3800 | 1200 | 1600 |
| 72 hrs. R.T. | 1400 | 1800 | 3800 | 3600 | 1400 | 1300 |
| 96 hrs. R.T. | 1400 | 1400 | 3900 | 3700 | — | — |
| 7 days | 1400 | 1700 | 3800 | 3800 | 1600 | 1300 |

It should be noted that in absence of JEFFAMINE ® BuD-2000 (formulations E & F), although high strength values are reached in a short period of time, because of apparent embrittlement, these values fall to much lower rather than constant values. With BuD-2000, the high strength values are maintained as shown in formulation C and D.

[1]Aminopropylene derivative of a 230 molecular weight polyoxypropylenepolymine
[2]Bisureide of a 2000 M.W. polyoxyyalkylenepolyamine

EXAMPLE 2

This example illustrates the same properties as Example 1 using a 400 molecular weight polyoxypropylene polyamine (JEFFAMINE ® D-400) to form the adduct with the epoxy resin.

| Development of Adhesive Bond Strength with Time: Curing with JEFFAMINE ® D-400 Bis(Propylamine) or Adduct | | | | |
|---|---|---|---|---|
| Formulation: | 4962-96B | 4962-48B | 4980-87B | 4980-87D |
| Epoxy resin (EEW 190) | 100 | 100 | 100 | 100 |
| JEFFAMINE ® D-400 BPA | 40 | — | 40 | — |
| JEFFAMINE ® D-400 BPA/Epoxy resin adduct | — | 56 | — | 56 |
| Accelerator 398 | — | — | 10 | 10 |
| JEFFAMINE ® BuD-2000 | — | — | 10 | 10 |
| Tensile shear strength, psi | | | | |
| after: 4 hrs., R.T. | — | — | — | 200 |
| 8 hrs., R.T. | 10 | 50 | 1200 | 1700 |
| 16 hrs., R.T. | 2500 | 1600 | 2200 | 2600 |
| 24 hrs., R.T. | 2700 | 2600 | 2600 | 2800 |
| 48 hrs., R.T. | 3300 | 3500 | 3100 | 3300 |
| 72 hrs., R.T. | 3300 | 3300 | 3200 | 3200 |
| 96 hrs., R.T. | 2400 | 3700 | 3400 | 3500 |
| 7 days, R.T. | 2000 | 2400 | 3100 | 3400 |

I claim:

1. An epoxy resin composition comprising:
   a vicinal polyepoxide having an average of at least 1.8 reactive 1,2-epoxy groups per molecule, and
   a reaction product of an epoxy resin with an excess of an aminopropyl derivative of a polyoxyalkylenepolyamine.

2. A composition as in claim 1 also containing a diureide of a polyoxyalkylenepolyamine of from 2000 to 3000 molecular weight.

3. A composition as in claim 1 also containing a composition effective in accelerating the cure.

4. A composition of claim 1 wherein the amino propyl derivative is comprised of one or more compounds having the formulae:

$$H_2NCH_2CH_2CH_2HNCH(CH_3)CH_2[OCH_2CH(CH_3)]_xNHCH_2CH_2CH_2NH_2 \quad (I)$$

where x=2 to 40 and

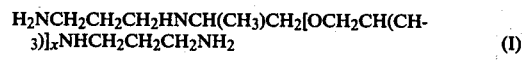

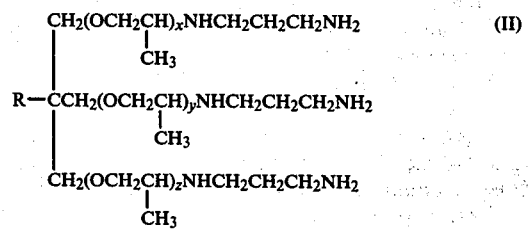

where R is a lower alkyl and x+y+z=3 to 40 and $$H_2NCH_2CH_2CH_2HNCHCH_2(OCHCH_2)_x\text{-}(OCH_2CH_2)_y(OCH_2CH)_zNHCH_2CH_2CH_2NH_2 \quad (II)$$

where x+z=2 to 10 and y=1 to 50.

5. An epoxy resin composition comprising:
   a vicinal polyepoxide having an average of at least 1.8 reactive 1,2-epoxy groups per molecule, and
   a reaction product of an epoxy resin with an excess of an aminopropyl derivative of a polyoxyalkylene polyamine of the formula:

H₂NCH₂CH₂CH₂HNCH(CH₃)CH₂[OCH₂CH(CH₃)]ₓNHCH₂CH₂CH₂NH₂ where x=2 to 40.

6. A composition of claim 5 wherein x is about 2.6, 5.6 or 33.1.

7. A composition of claim 5 wherein x is about 2.6 or 5.6.

8. The composition of claim 2 wherein said diureide is of the formula $$\begin{array}{c} CH_2(OCH_2CH)_x NHCH_2CH_2CH_2NH_2 \\ | \\ CH_3 \\ | \\ R-CCH_2(OCH_2CH)_y NHCH_2CH_2CH_2NH_2 \\ | \\ CH_3 \\ | \\ CH_2(OCH_2CH)_z NHCH_2CH_2CH_2NH_2 \\ | \\ CH_3 \end{array}$$ (II)

where R is alkyl and $$H_2NCH_2CH_2CH_2HNCH_2(O\overset{CH_3}{\underset{|}{C}}HCH_2)_x(OCH_2CH_2)_y(OCH_2\overset{CH_3}{\underset{|}{C}}H)_zNHCH_2CH_2CH_2NH_2$$ (III)

$$[R-NH-\overset{O}{\underset{\|}{C}}-NH-(\underset{X}{\overset{|}{C}}H-\underset{H}{\overset{|}{C}}HO)_n]_2-Z$$

wherein R is hydrogen; or, a branched or straight chain alkyl radical of from 1 to about 10 carbon atoms, or a monocyclic aryl, alkaryl or aralkyl having from 6 to about 12 carbon atoms; or, are branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

9. The composition of claim 8 wherein R is hydrogen or a lower alkyl; X is a methyl radical; Z is a 1,2-propaylene radical; and n is an average number from 16 to 19.

10. The composition of claim 8 wherein R is hydrogen.

11. The composition of claim 9 wherein R is a lower alkyl radical selected from the group consisting of methyl, ethyl, n-propyl and n-butyl.

12. A method for increasing the adhesive strength of a cured epoxy resin composition having an average of at least 1.8 reactive 1,2-epoxy groups per molecule comprising the steps of:
adding to said epoxy resin an effective amount of a reaction product of an epoxy resin with an excess of an aminopropyl derivative of a polyoxyalkylenepolyamine.

13. A method as in claim 12 wherein there is also added a diureide of a polyoxyalkylenepolyamine of from 2000 to 3000 molecular weight.

14. A method as in claim 1 wherein there is also added a composition effective in accelerating the cure.

15. A method as in claim 12 wherein the amino propyl derivative is comprised of one or more compounds having the formula:

H₂NCH₂CH₂CH₂HNCH(CH₃)CH₂[OCH₂CH(CH₃)]ₓNHCH₂CH₂CH₂NH₂ (I)

where x=2 to 40 and where x+y=2 to 10 and y=1 to 50.

16. A method for increasing the adhesive strength of a cured epoxy resin composition having an average of at least 1.8 reactive 1,2-epoxy groups per molecule comprising the step of:
adding to said epoxy resin an effective amount of a reaction product of an epoxy resin with an excess of an aminopropyl derivative of a polyoxyalkylene polyamine of the formula:

H₂NCH₂CH₂CH₂HNCH(CH₃)CH₂[OCH₂CH(CH₃)]ₓNHCH₂CH₂CH₂NH₂ where x=2 to 40.

17. A method as in claim 16 wherein x is about 2.6, 5.6 or 33.1.

18. A method as in claim 16 wherein x is about 2.6 or 5.6.

19. The method of claim 13 wherein said diureide is of the formula $$[R-NH-\overset{O}{\underset{\|}{C}}-NH-(\underset{X}{\overset{|}{C}}H-\underset{H}{\overset{|}{C}}HO)_n]_2-Z$$

wherein R is hydrogen; or, a branched or straight chain alkyl radical of from 1 to about 10 carbon atoms, or a monocyclic aryl, alkaryl or aralkyl having from 6 to about 12 carbon atoms; or, are branched or straight chain alkenyl or alkadienyl radical of from 2 to about 10 carbon atoms; X is hydrogen, a methyl radical or an ethyl radical; Z is a hydrocarbon alkylene radical having 2 to 5 carbon atoms and n is a number selected such that the molecule of the above formula has a molecular weight of from about 2000 to about 3000.

20. The method of claim 19 wherein R is hydrogen or a lower alkyl; X is a methyl radical; Z is a 1,2-propylene radical; and n is an average number from 16 to 19.

21. The method of claim 20 wherein R is hydrogen.

22. The method of claim 20 wherein R is a lower alkyl radical selected from the group consisting of methyl, ethyl, n-propyl and n-butyl.

* * * * *